United States Patent
Hirata

(10) Patent No.: US 12,518,924 B2
(45) Date of Patent: Jan. 6, 2026

(54) MULTILAYER CERAMIC CAPACITOR

(71) Applicant: Murata Manufacturing Co., Ltd., Nagaokakyo (JP)

(72) Inventor: Naoto Hirata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 121 days.

(21) Appl. No.: 18/621,233

(22) Filed: Mar. 29, 2024

(65) Prior Publication Data

US 2025/0292962 A1 Sep. 18, 2025

(30) Foreign Application Priority Data

Mar. 18, 2024 (JP) ................. 2024-042287

(51) Int. Cl.
| | |
|---|---|
| *H01G 4/12* | (2006.01) |
| *H01G 4/008* | (2006.01) |
| *H01G 4/012* | (2006.01) |
| *H01G 4/232* | (2006.01) |
| *H01G 4/30* | (2006.01) |

(52) U.S. Cl.
CPC .......... *H01G 4/1227* (2013.01); *H01G 4/008* (2013.01); *H01G 4/2325* (2013.01); *H01G 4/30* (2013.01)

(58) Field of Classification Search
CPC .... H01G 4/1227; H01G 4/008; H01G 4/2325; H01G 4/30
See application file for complete search history.

(56) References Cited

U.S. PATENT DOCUMENTS

| | | | |
|---|---|---|---|
| 2013/0063862 A1* | 3/2013 | Kim .................. | H01G 4/30 156/182 |
| 2015/0279564 A1* | 10/2015 | Naito ................. | H01G 4/1227 361/301.4 |
| 2017/0178812 A1* | 6/2017 | Shimada .............. | H01G 4/248 |
| 2017/0330688 A1* | 11/2017 | Lim .................. | H01G 4/306 |
| 2018/0082787 A1* | 3/2018 | Hamamori ........... | H01G 4/232 |
| 2022/0392704 A1* | 12/2022 | Iguchi ................ | H01G 4/008 |
| 2025/0210265 A1* | 6/2025 | Hidaka ............... | H01G 4/008 |

FOREIGN PATENT DOCUMENTS

| | | |
|---|---|---|
| JP | 2001-237137 A | 8/2001 |
| KR | 20140031739 A | 3/2014 |

* cited by examiner

*Primary Examiner* — Michael P McFadden
(74) *Attorney, Agent, or Firm* — Keating & Bennett, LLP

(57) ABSTRACT

In a multilayer ceramic capacitor, a segregation amount of silicon and magnesium on an outer layer side of an outermost internal electrode layer is larger than a segregation amount of silicon and magnesium on an inner layer side of the outermost internal electrode layer, and when a region defined by an existence region of the outermost internal electrode layer and a segregation region of silicon and magnesium in contact with the outermost internal electrode layer is defined as a first region, a line edge roughness of an outer layer side of the first region is larger than a line edge roughness of an inner layer side of the first region.

20 Claims, 10 Drawing Sheets

FIG. 10

| No. | AVERAGE THICKNESS C OF INTERNAL ELECTRODE [mm] | INNER LAYER SIDE LINE EDGE ROUGHNESS (LER) B [mm] | RATIO OF INNER LAYER SIDE LINE EDGE ROUGHNESS (LER) B TO ELECTRODE THICKNESS B/C [-] | OUTER LAYER SIDE LINE EDGE ROUGHNESS (LER) A [mm] | RATIO OF OUTER LAYER SIDE LINE EDGE ROUGHNESS (LER) TO ELECTRODE THICKNESS A/C = D [-] | RATIO OF OUTER LAYER SIDE LINE EDGE ROUGHNESS (LER) TO INNER LAYER SIDE LINE EDGE ROUGHNESS (LER) (A/B) = E [-] | RATIO OF OUTER LAYER SIDE AREA TO INNER LAYER SIDE AREA OF OUTERMOST INTERNAL ELECTRODE F [-] | NUMBER OF OCCURRENCE OF OUTER LAYER PEELING (per 100 piece) | DETERMINATION OF LAYER PEELING AFTER FIRING |
|---|---|---|---|---|---|---|---|---|---|
| EXAMPLE 1 | 0.90 | 0.042 | 0.047 | 0.121 | 0.134 | 2.88 | 1.45 | 2 | ◎ |
| EXAMPLE 2 | 0.95 | 0.034 | 0.036 | 0.088 | 0.093 | 2.58 | 1.22 | 4 | ◎ |
| EXAMPLE 3 | 0.91 | 0.055 | 0.060 | 0.142 | 0.156 | 2.58 | 1.34 | 1 | ◎ |
| EXAMPLE 4 | 0.93 | 0.124 | 0.133 | 0.317 | 0.341 | 2.56 | 1.28 | 2 | ◎ |
| EXAMPLE 5 | 0.97 | 0.033 | 0.034 | 0.221 | 0.228 | 6.70 | 1.47 | 0 | ◎ |
| EXAMPLE 6 | 0.91 | 0.086 | 0.095 | 0.219 | 0.241 | 2.55 | 1.19 | 8 | ◎ |
| EXAMPLE 7 | 0.94 | 0.182 | 0.194 | 0.224 | 0.238 | 1.23 | 1.26 | 9 | ◎ |
| EXAMPLE 8 | 0.90 | 0.050 | 0.056 | 0.138 | 0.153 | 2.76 | 1.17 | 3 | ◎ |
| EXAMPLE 9 | 0.97 | 0.061 | 0.063 | 0.142 | 0.146 | 2.33 | 2.11 | 2 | ◎ |
| EXAMPLE 10 | 0.88 | 0.055 | 0.063 | 0.145 | 0.165 | 2.64 | 3.30 | 4 | ◎ |
| EXAMPLE 11 | 0.90 | 0.055 | 0.061 | 0.085 | 0.094 | 1.55 | 1.18 | 4 | ◎ |
| EXAMPLE 12 | 0.89 | 0.033 | 0.037 | 0.144 | 0.162 | 4.36 | 1.75 | 10 | ◎ |
| EXAMPLE 13 | 0.92 | 0.042 | 0.046 | 0.150 | 0.163 | 3.57 | 1.75 | 4 | ◎ |
| EXAMPLE 14 | 0.95 | 0.040 | 0.042 | 0.088 | 0.093 | 2.20 | 1.12 | 26 | ○ |
| EXAMPLE 15 | 0.99 | 0.064 | 0.065 | 0.144 | 0.145 | 2.25 | 1.14 | 21 | ○ |
| EXAMPLE 16 | 0.88 | 0.140 | 0.159 | 0.300 | 0.341 | 2.14 | 1.10 | 12 | ○ |
| EXAMPLE 17 | 0.94 | 0.171 | 0.182 | 0.210 | 0.223 | 1.23 | 1.02 | 17 | ○ |
| EXAMPLE 18 | 0.91 | 0.064 | 0.070 | 0.205 | 0.225 | 3.21 | 1.13 | 16 | ○ |
| EXAMPLE 19 | 0.92 | 0.031 | 0.034 | 0.210 | 0.228 | 6.70 | 1.15 | 15 | ○ |
| EXAMPLE 20 | 0.92 | 0.075 | 0.082 | 0.083 | 0.090 | 1.11 | 1.15 | 45 | △ |
| EXAMPLE 21 | 0.91 | 0.064 | 0.070 | 0.071 | 0.078 | 1.11 | 1.13 | 64 | △ |
| EXAMPLE 22 | 0.88 | 0.044 | 0.050 | 0.312 | 0.355 | 7.09 | 1.05 | 33 | △ |
| COMPARATIVE EXAMPLE 1 | 0.96 | 0.052 | 0.054 | 0.050 | 0.052 | 0.96 | 0.99 | 80 | × |
| COMPARATIVE EXAMPLE 2 | 0.98 | 0.050 | 0.051 | 0.045 | 0.046 | 0.90 | 0.94 | 93 | × |
| COMPARATIVE EXAMPLE 3 | 0.94 | 0.045 | 0.054 | 0.042 | 0.050 | 0.93 | 0.91 | 88 | × |

MULTILAYER CERAMIC CAPACITOR

CROSS REFERENCE TO RELATED APPLICATIONS

This application claims the benefit of priority to Japanese Patent Application No. 2024-042287 filed on Mar. 18, 2024. The entire contents of this application are hereby incorporated herein by reference.

BACKGROUND OF THE INVENTION

1. Field of the Invention

The present invention relates to multilayer ceramic capacitors.

2. Description of the Related Art

For example, the multilayer ceramic capacitor described in Japanese Unexamined Patent Application Publication No. 2001-237137 includes a capacitor body of a ceramic sintered body made of a dielectric material such as barium titanate. Such a capacitor body includes internal electrode layers each made of a noble metal material such as silver or a silver-palladium alloy, or a base metal material such as nickel with a ceramic layer functioning as a dielectric layer interposed therebetween. The internal electrode layers alternately extend toward one end surface and the other end surface of the capacitor body. The internal electrode layers extending toward the one end surface and the internal electrode layers extending toward the other end surface are electrically connected to respective one of external electrodes having different potentials.

The internal electrode layers of the multilayer capacitor described in Japanese Unexamined Patent Application Publication No. 2001-237137 are each made of a metal material, and the external electrodes are each made of a plurality of metal components including the same metal as that of the internal electrode layers or a metal capable of being alloyed with the metal of the internal electrode layers, and a glass component. The external electrodes are each bonded to a wiring board via an electrically conductive resin adhesive. The area occupation ratio of the metal component to the cross-sectional area of each of the external electrodes ranges from 60% to 95%. Thus, the multilayer capacitor described in Japanese Unexamined Patent Application Publication No. 2001-237137 can be mounted on the wiring board at low cost with high reliability without using solder.

A multilayer body included in a general multilayer ceramic capacitor as described above includes an inner layer portion and outer layer portions in the height direction. The inner layer portion includes dielectric layers and internal electrode layers that are laminated. None of the outer layer portions include any internal electrode layer, but include only the dielectric layers. In the prior art, the mechanical bonding force between the inner layer portion and each of the outer layer portions is not high. Therefore, when mechanical stress is applied to the multilayer ceramic capacitor, layer peeling may occur between the inner layer portion and the outer layer portions.

SUMMARY OF THE INVENTION

Example embodiments of the present invention provide multilayer ceramic capacitors that are each able to reduce or prevent the occurrence of layer peeling when mechanical stress is applied.

An example embodiment of the present invention provides a multilayer ceramic capacitor that includes a multilayer body including a plurality of laminated dielectric layers and a plurality of laminated internal electrode layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, an inner layer portion including the plurality of dielectric layers and the plurality of internal electrode layers that are alternately laminated, and outer layer portions that sandwich the inner layer portion in the height direction, a first external electrode on the first end surface, and a second external electrode on the second end surface, in which when, among the plurality of laminated internal electrode layers, an internal electrode layer positioned closest to the outer layer portion is defined as an outermost internal electrode layer, a segregation amount of silicon and magnesium on an outer layer side of the outermost internal electrode layer is larger than a segregation amount of silicon and magnesium on an inner layer side of the outermost internal electrode layer, and, when a region defined by an existence region of the outermost internal electrode layer and a segregation region of silicon and magnesium in contact with the outermost internal electrode layer is defined as a first region, a line edge roughness A of an outer layer side of the first region is larger than a line edge roughness B of an inner layer side of the first region.

According to example embodiments of the present invention, it is possible to provide multilayer ceramic capacitors that are each able to reduce or prevent occurrence of layer peeling when mechanical stress is applied.

The above and other elements, features, steps, characteristics and advantages of the present invention will become more apparent from the following detailed description of the example embodiments with reference to the attached drawings.

BRIEF DESCRIPTION OF THE DRAWINGS

FIG. 10 is a table showing evaluation results of Examples and Comparative Examples.

DETAILED DESCRIPTION OF THE EXAMPLE EMBODIMENTS

Example embodiments of the present invention will be described in detail below with reference to the drawings.

Multilayer Ceramic Capacitor

Figure 1:
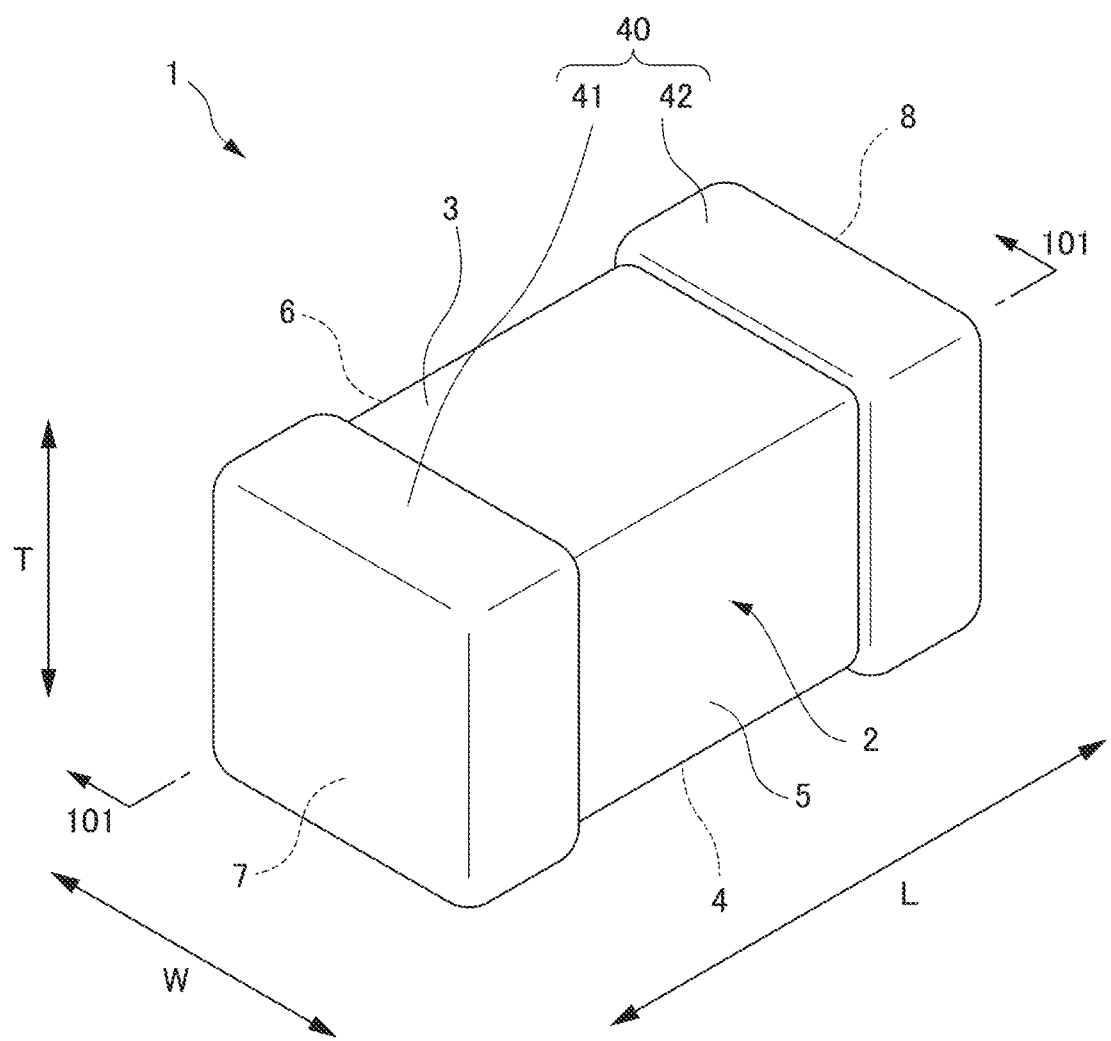
FIG. 1 is an external perspective view of a multilayer ceramic capacitor according to an example embodiment of the present invention.
Figure 2:
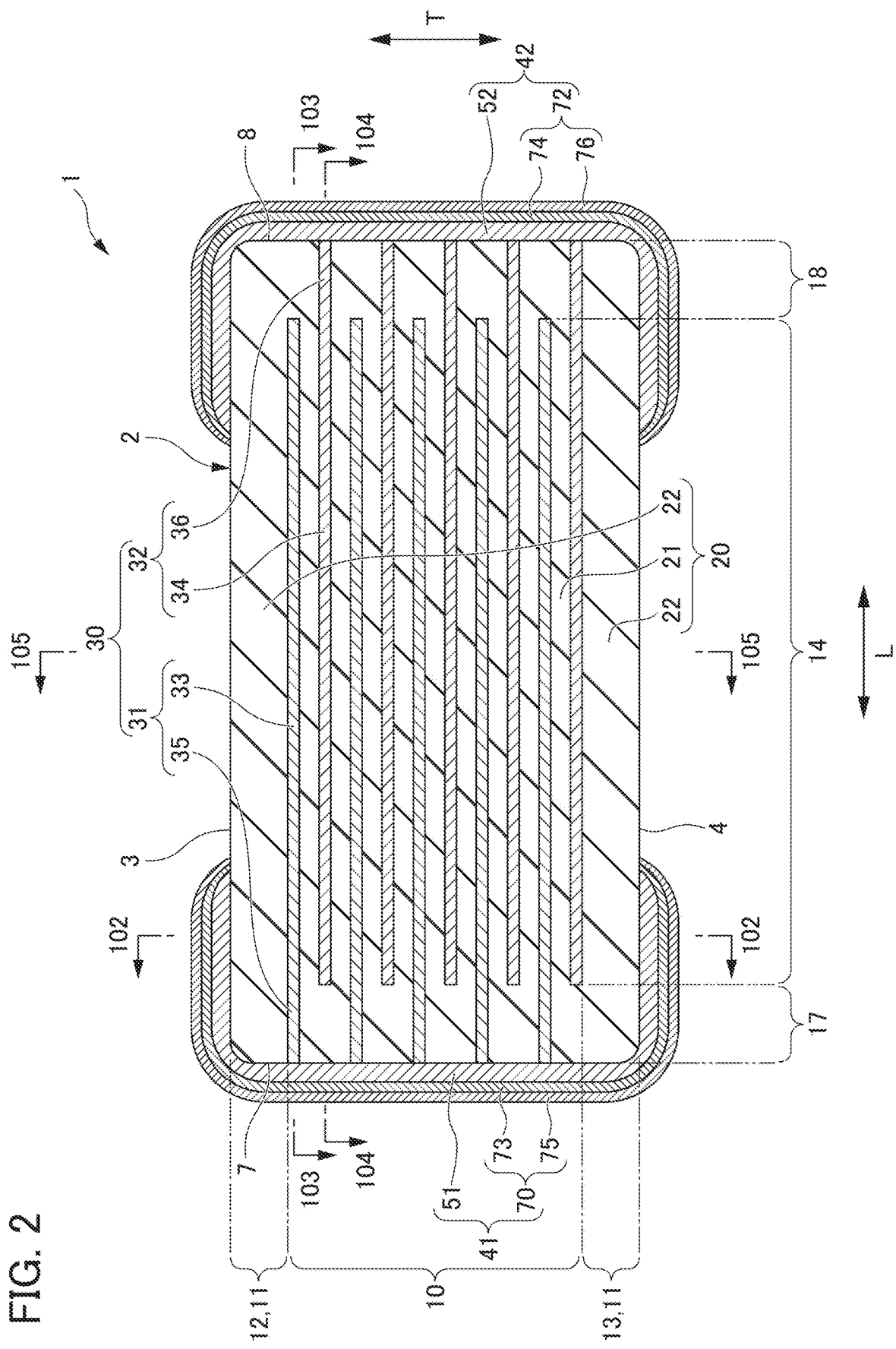
FIG. 2 is a cross-sectional view taken along the line 101-101 of FIG. 1.
Figure 3:
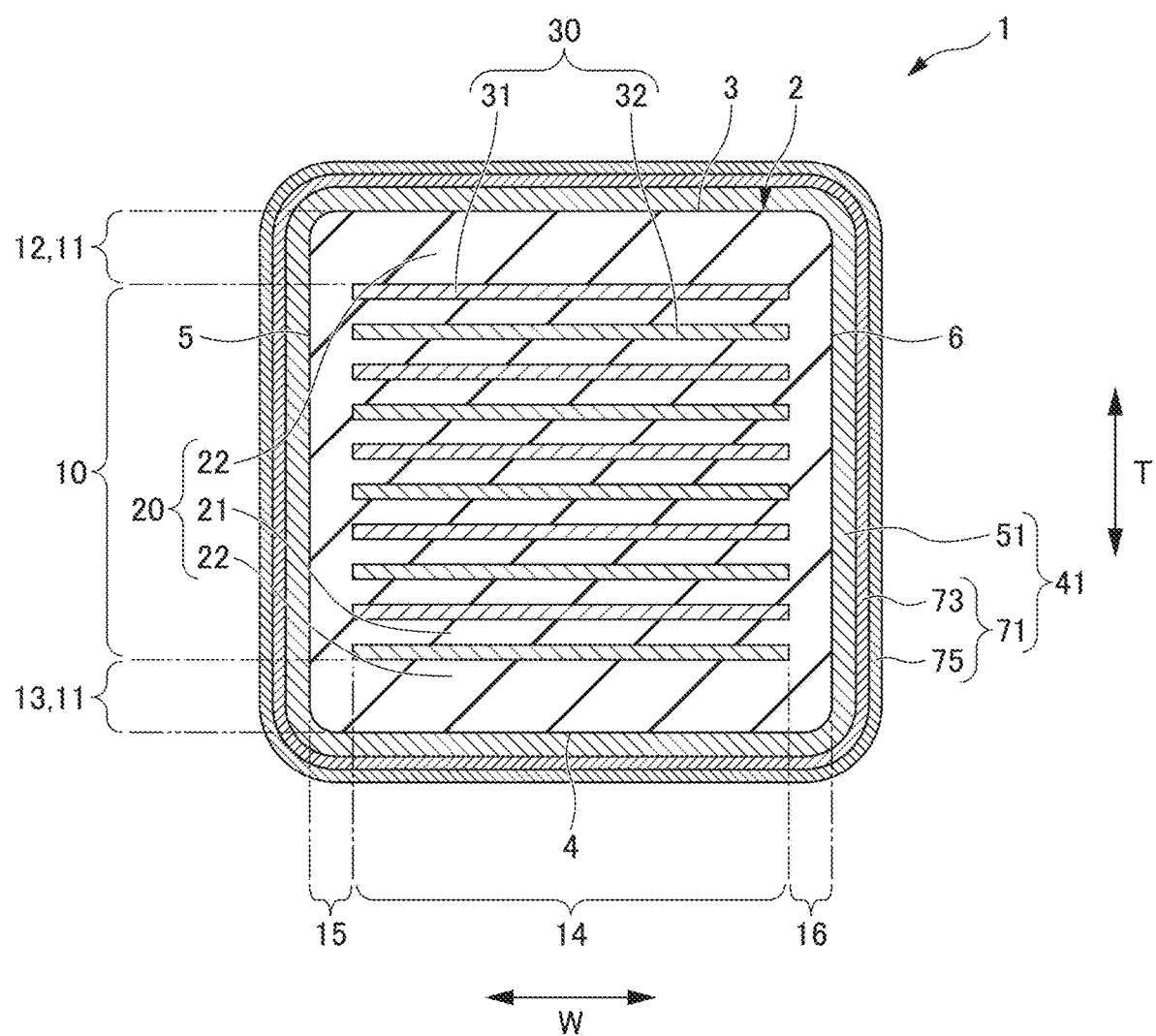
FIG. 3 is a cross-sectional view taken along the line 102-102 of FIG. 2.
Figure 4:
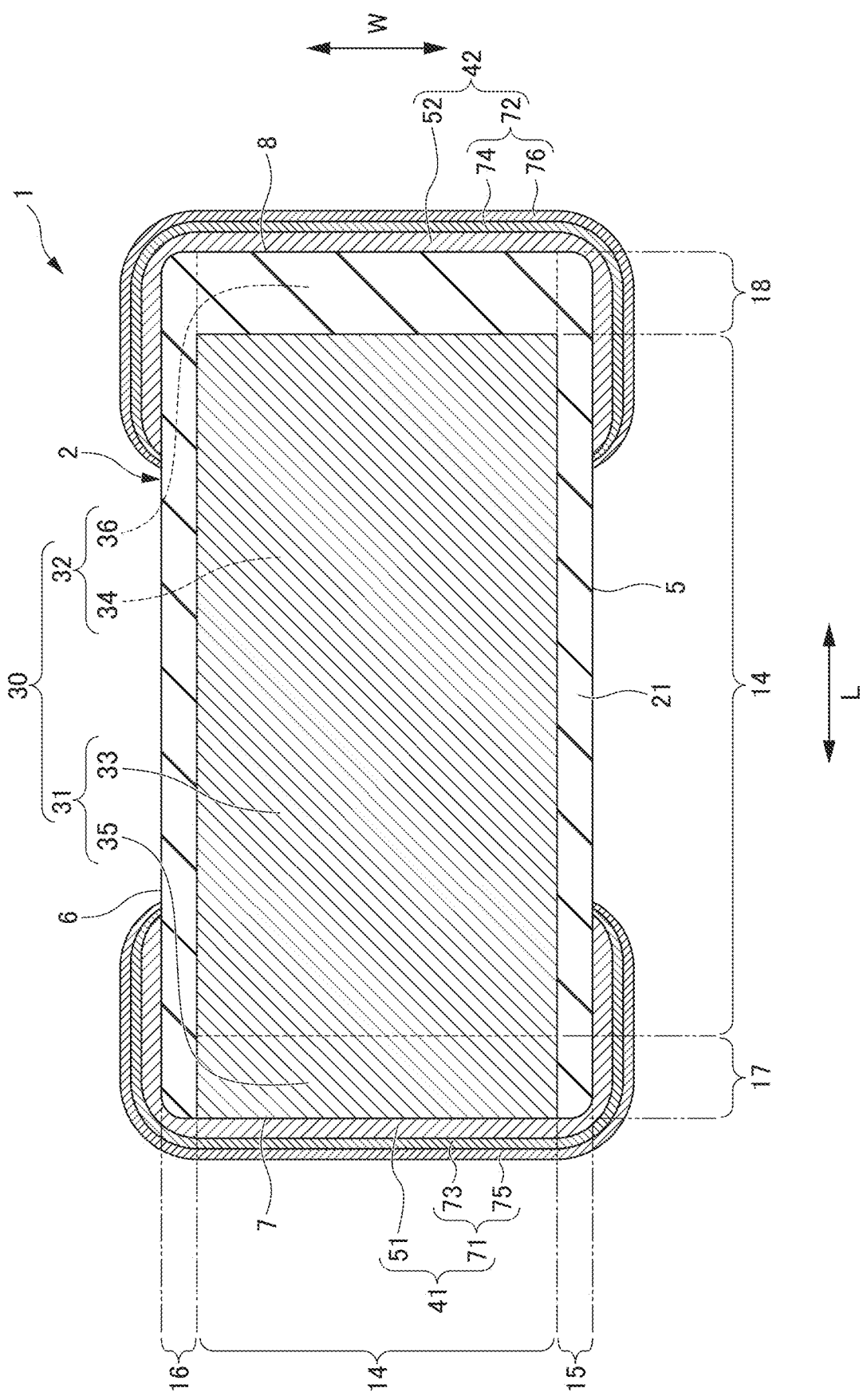
FIG. 4 is a cross-sectional view taken along the line 103-103 of FIG. 2.
Figure 5:
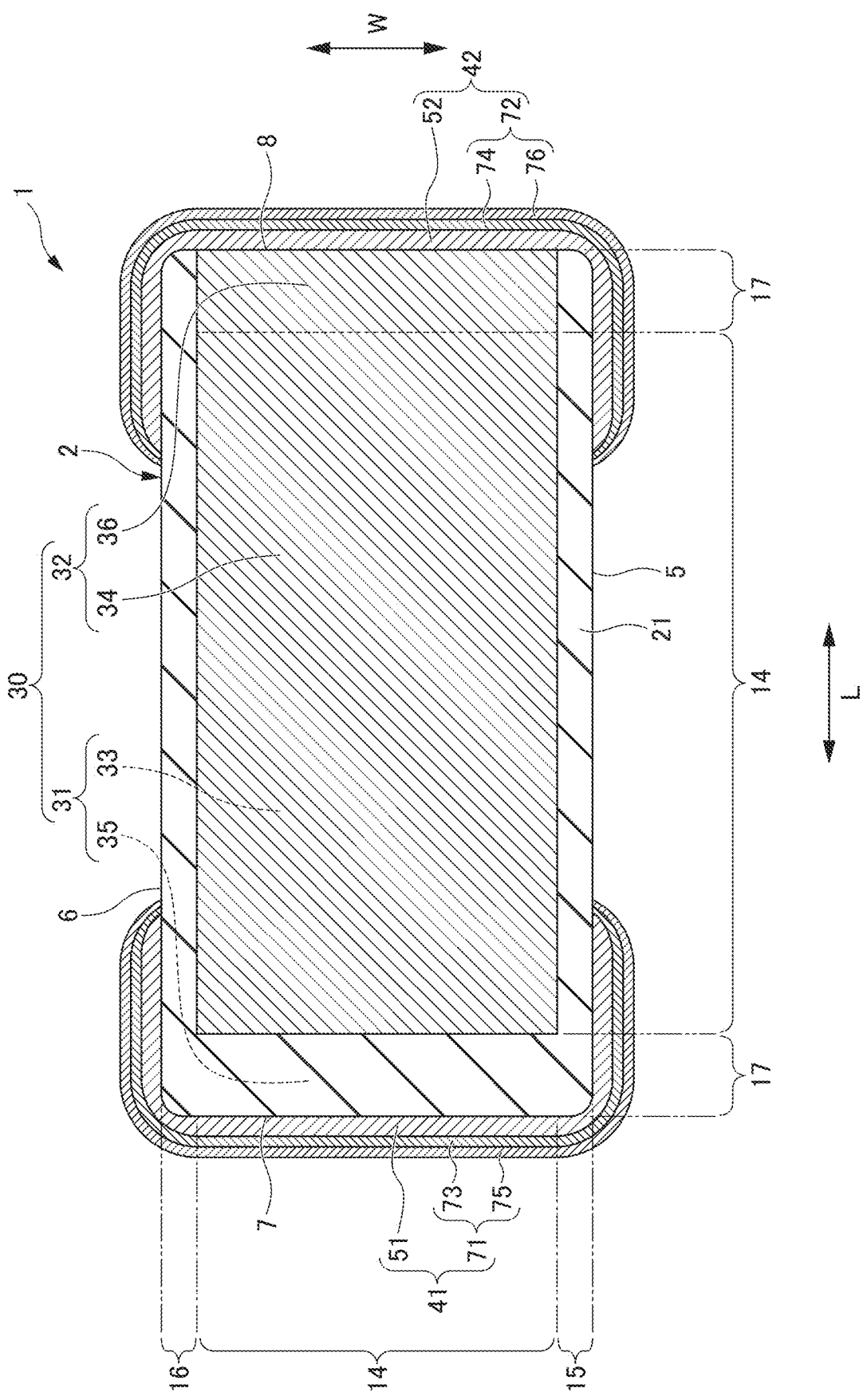
FIG. 5 is a cross-sectional view taken along the line 104-104 of FIG. 2.

A multilayer ceramic capacitor 1 according to an example embodiment of the present invention will be described with reference to the drawings. FIG. 1 is an external perspective view of a multilayer ceramic capacitor 1 according to an example embodiment of the present invention. FIG. 2 is a cross-sectional view taken along the line 101-101 of FIG. 1. FIG. 3 is a cross-sectional view taken along the line 102-102 of FIG. 2. FIG. 4 is a cross-sectional view taken along the line 103-103 of FIG. 2. FIG. 5 is a cross-sectional view taken along the line 104-104 of FIG. 2.

As shown in FIG. 1, the multilayer ceramic capacitor 1 has a rectangular or substantially rectangular parallelepiped shape. The multilayer ceramic capacitor 1 includes a multilayer body 2 having a rectangular or substantially rectangular parallelepiped shape and a pair of external electrodes 40 spaced apart from each other at both end portions of the multilayer body 2.

In FIG. 1, an arrow T indicates a height direction of the multilayer ceramic capacitor 1 and the multilayer body 2. The height direction T also refers to a thickness direction and a lamination (stacking) direction of the multilayer ceramic capacitor 1 and the multilayer body 2. In FIG. 1, an arrow L indicates a length direction orthogonal or substantially orthogonal to the height direction T of the multilayer ceramic capacitor 1 and the multilayer body 2. In FIG. 1, an arrow W indicates a width direction orthogonal or substantially orthogonal to the height direction T and the length direction L of the multilayer ceramic capacitor 1 and the multilayer body 2. The pair of external electrodes 40 is respectively provided at one end and the other end of the multilayer body 2 in the length direction L.

The cross section shown in FIG. 2 is defined as an LT cross section. The cross section shown in FIG. 3 is defined as a WT cross section. The cross section shown in FIG. 4 and the cross section shown in FIG. 5 are defined as an LW cross sections.

Multilayer Body

Two surfaces of the multilayer body 2 opposed to each other in the height direction T are defined as a first main surface 3 and a second main surface 4. Two surfaces opposed to each other in the length direction L orthogonal or substantially orthogonal to the height direction T of the multilayer body are defined as a first end surface 7 and a second end surface 8. Two surfaces opposed to each other in the width direction W orthogonal or substantially orthogonal to the height direction T and the length direction L of the multilayer body 2 are defined as a first lateral surface 5 and a second lateral surface 6.

As shown in FIG. 1, the multilayer body 2 has a rectangular or substantially rectangular parallelepiped shape. The length in the length direction L of the multilayer body 2 may not be longer than the length in the width direction W. The shapes of the corner portions of the multilayer body 2 and the ridge portions of the multilayer body 2 are preferably rounded. Each of the corner portions is a portion where the three surfaces of the multilayer body intersect. Each of the ridge portions is a portion where two surfaces of the multilayer body intersect. A portion or the entirety of the surface of the multilayer body 2 may have unevenness or the like.

The size of the multilayer body 2 is not limited. A preferable length in the length direction L of the multilayer body 2 is, for example, about 0.2 mm or more and about 6 mm or less. A preferable length in the height direction T of the multilayer body 2 is, for example, about 0.05 mm or more and about 5 mm or less. The length of the multilayer body 2 in the width direction W is, for example, preferably about 0.1 mm or more and about 5 mm or less.

Segmentation in Height Direction

As shown in FIGS. 2 and 3, the multilayer body 2 is divided into an inner layer portion 10 and main surface-side outer layer portions 11 in the height direction T. The main surface-side outer layer portions 11 include a first main surface-side outer layer portion 12 and a second main surface-side outer layer portion 13. The first main surface-side outer layer portion 12 and the second main surface-side outer layer portion 13 sandwich the inner layer portion 10 in the height direction T. That is, the multilayer body 2 is divided into the first main surface-side outer layer portion 12, the inner layer portion 10, and the second main surface-side outer layer portion 13.

Dielectric Layer

The inner layer portion 10 includes a plurality of dielectric layers 20 and a plurality of internal electrode layers 30 alternately laminated in the height direction T. The inner layer portion 10 includes the internal electrode layers 30 from an internal electrode layer 30 positioned closest to the first main surface 3 to an internal electrode layer 30 positioned closest to the second main surface 4 in the height direction T. In the inner layer portion 10, the plurality of internal electrode layers 30 are opposed to each other with the dielectric layer 20 interposed therebetween. The inner layer portion 10 is a portion that substantially defines and functions as a capacitor for generating capacitance. The dielectric layers 20 included in the inner layer portion 10 are defined as inner dielectric layers 21. The dielectric layers 20 included in the first main surface-side outer layer portion 12 and the dielectric layers 20 included in the second main surface-side outer layer portion 13 are each defined as an outer dielectric layer 22.

The plurality of dielectric layers 20 are made of a dielectric material. Examples of dielectric materials include dielectric ceramics that include components such as barium titanate, calcium titanate, strontium titanate, or calcium zirconate. The dielectric material may be obtained by adding a subcomponent such as, for example, a manganese compound, an iron compound, a copper compound, a cobalt compound, or a nickel compound to the main component. A preferable material of the dielectric material includes, for example, a material including barium titanate as a main component.

The thickness of each of the dielectric layers 20 is, for example, preferably about 0.2 μm or more and about 10 μm or less. The number of the laminated dielectric layers 20 is, for example, preferably 15 or more and 1200 or less. The number of layers of the dielectric layer 20 is the sum of the number of the inner dielectric layers 21 and the number of the outer dielectric layers 22.

Internal Electrode Layer

The plurality of internal electrode layers 30 includes a plurality of first internal electrode layers 31 and a plurality of second internal electrode layers 32. The first internal electrode layers 31 and the second internal electrode layers 32 are alternately provided in the height direction T with the dielectric layer 20 interposed therebetween. The first internal electrode layers 31 each extend toward the first end surface 7 and are exposed at the first end surface 7. The second internal electrode layers 32 each extend toward the second end surface 8 and are exposed at the second end surface 8.

As shown in FIG. 4, each of the first internal electrode layers 31 is divided into a first counter portion 33 and a first extension portion 35. Each of the first counter portions 33 is opposed to the second internal electrode layer 32 with the dielectric layer 20 interposed therebetween. Each of the first extension portions 35 extends from the first counter portion 33 toward the first end surface 7. The first extension portion 35 is exposed at the first end surface 7.

As shown in FIG. 5, each of the second internal electrode layers 32 is divided into a second counter portion 34 and a second extension portion 36. Each of the second counter portions 34 is opposed to the first internal electrode layer 31 with the dielectric layer 20 interposed therebetween. The second extension portion 36 extends from the second counter portion 34 toward the second end surface 8. The second extension portion 36 is exposed at the second end surface 8.

In the multilayer ceramic capacitor 1, the first counter portion 33 and the second counter portion 34 are opposed to each other with the dielectric layer 20 interposed therebetween, such that a capacitance is generated. With such a configuration, the characteristics of the capacitor are developed in the multilayer ceramic capacitor 1.

The shape of each of the first counter portions 33 and the second counter portions 34 is not limited. A preferable shape of each of the first counter portions 33 and the second counter portions 34 is a rectangular or substantially rectangular shape. Similarly, the shape of each of the first extension portions 35 and the second extension portions 36 are not limited. A preferable shape of each of the first extension portions 35 and the second extension portions 36 is a rectangular or substantially rectangular shape. In the above-described rectangular shape, each of the rectangular corner portions may have a rounded shape. Each of the rectangular corner portions may have an oblique shape.

The length of each of the first counter portions 33 in the width direction W and the length of each of the first extension portion 35 in the width direction W may be the same or substantially the same. Either one of the length of each of the first counter portions 33 in the width direction W and the length of each of the first extension portions 35 in the width direction W may be shorter. The length of each of the second counter portions 34 in the width direction W and the length of each of the second extension portions 36 in the width direction W may be the same or substantially the same. Either one of the length of each of the second counter portions 34 in the width direction W and the length of each of the second extension portions 36 in the width direction W may be shorter.

Examples of the material of each of the first internal electrode layers 31 and the second internal electrode layers 32 include an electrically conductive material such as a metal such as nickel, copper, silver, palladium, or gold, or an alloy including at least one of these metals. When an alloy is used, examples of the material of each of the first internal electrode layers 31 and the second internal electrode layers 32 is an alloy of silver and palladium.

Examples of preferable thicknesses of each of the first internal electrode layers 31 and the second internal electrodes layer 32 are about 0.2 μm or more and about 2.0 μm or less. A preferable number of layers of the sum of the first internal electrode layers 31 and the second internal electrode layers 32 is, for example, 15 or more and 1000 or less.

Main Surface-Side Outer Layer Portion

As shown in FIGS. 2 and 3, a portion of an aggregate of the plurality of dielectric layers 20 positioned between the first main surface 3 and the internal electrode layer 30 closest to the first main surface 3 is defined as the first main surface-side outer layer portion 12. The first main surface-side outer layer portion 12 is adjacent to the first main surface 3 of the multilayer body 2. A portion of an aggregate of the plurality of dielectric layers 20 positioned between the second main surface 4 and the internal electrode layer 30 closest to the second main surface 4 is defined as the second main surface-side outer layer portion 13. The second main surface-side outer layer portion 13 is adjacent to the second main surface 4 of the multilayer body 2. The dielectric layers 20 of the first main surface-side outer layer portion 12 and the second main surface-side outer layer portion 13 may be the same or substantially the same as the dielectric layers 20 of the inner layer portion 10. The material of the inner dielectric layers 21 and the material of the outer dielectric layers 22 may be the same.

Electrode Counter Portion

A portion where the first counter portion 33 of each of the first internal electrode layers 31 and the second counter portion 34 of each of the second internal electrode layers 32 are opposed to each other is defined as an electrode counter portion 14. The electrode counter portion 14 is a portion of the inner layer portion 10. FIGS. 4 and 5 each show the range of the electrode counter portion 14 in the width direction W and the length direction L. The electrode counter portion 14 is also defined as a capacitor effective portion.

Segmentation in Direction W

The multilayer body 2 is divided into a first lateral surface-side outer layer portion 15, the electrode counter portion 14, and a second lateral surface-side outer layer portion 16 in the width direction W. The first lateral surface-side outer layer portion 15 is a portion including the dielectric layers 20 positioned between the electrode counter portion 14 and the first lateral surface 5. The second lateral surface-side outer layer portion 16 is a portion including the dielectric layers 20 positioned between the electrode counter portion 14 and the second lateral surface 6. FIG. 3, FIG. 4, and FIG. 5 each show the ranges of the first lateral surface-side outer layer portion 15, the electrode counter portion 14, and the second lateral surface-side outer layer portion 16 in the width direction W. The first lateral surface-side outer layer portion 15 and the second lateral surface-side outer layer portion 16 are each defined as a W gap or a side gap.

Segmentation in Direction L

The multilayer body 2 is divided into a first end surface-side outer layer portion 17, the electrode counter portion 14, and a second end surface-side outer layer portion 18 in the length direction L. The first end surface-side outer layer portion 17 is a portion including the dielectric layers 20 and the first extension portions 35 positioned between the electrode counter portion 14 and the first end surface 7. The first end surface-side outer layer portion 17 is an aggregate of portions of the plurality of dielectric layers 20 adjacent to the first end surface 7 and the plurality of first extension portions 35. The second end surface-side outer layer portion 18 is a portion including the dielectric layers 20 and the second extension portion 36 positioned between the electrode counter portion 14 and the second end surface 8. The second end surface-side outer layer portion 18 is an aggregate of portions of the plurality of dielectric layers 20 adjacent to the second end surface 8 and the plurality of second extension portions 36. FIG. 2, FIG. 4, and FIG. 5 each show the ranges of the first end surface-side outer layer portion 17, the electrode counter portion 14, and the second end surface-side outer layer portion 18 in the length direction L. The first end surface-side outer layer portion 17 and the second end surface-side outer layer portion 18 are each defined as an L gap or an end gap.

External Electrode

The external electrodes 40 includes a first external electrode 41 and a second external electrode 42. The first external electrode 41 is an external electrode on the first end surface 7 of the multilayer body 2. The second external electrode 42 is an external electrode on the second end surface 8 side of the multilayer body 2.

The basic configurations of the first external electrode 41 and the second external electrode 42 are the same or substantially the same. The first external electrode 41 and the second external electrode 42 have a plane symmetrical or substantially plane symmetrical shape with respect to the WT cross section at the center in the length direction L of the multilayer ceramic capacitor 1.

The first external electrode 41 is on the first end surface 7. The first external electrode 41 contacts the first extension portion 35 of each of the plurality of first internal electrode layers 31 exposed at the first end surface 7. The first external electrode 41 is electrically connected to each of the plurality of first internal electrode layers 31. The first external electrode 41 may also be on a portion of the first main surface 3 and a portion of the second main surface 4, and also on a portion of the first lateral surface 5 and a portion of the second lateral surface 6. In the present example embodiment, the first external electrode 41 extends from the first end surface 7 to a portion of the first main surface 3 and a portion of the second main surface 4, and to a portion of the first lateral surface 5 and a portion of the second lateral surface 6.

The second external electrode 42 is on the second end surface 8. The second external electrode 42 contacts the second extension portion 36 of each of the plurality of second internal electrode layers 32 exposed at the second end surface 8. The second external electrode 42 is electrically connected to each of the plurality of second internal electrode layers 32. The second external electrode 42 may also be on a portion of the first main surface 3 and a portion of the second main surface 4, and also on a portion of the first lateral surface 5 and a portion of the second lateral surface 6. In the present example embodiment, the second external electrode 42 extends from the second end surface 8 to a portion of the first main surface 3 and a portion of the second main surface 4, and to a portion of the first lateral surface 5 and a portion of the second lateral surface 6.

In the multilayer body 2, the first counter portion 33 of each of the first internal electrode layers 31 and the second counter portion 34 of each of the second internal electrode layers 32 are opposed to each other with the dielectric layer 20 interposed therebetween, such that a capacitance is generated. Therefore, the characteristic of the capacitor is developed between the first external electrode 41 to which the plurality of first internal electrodes layer 31 are connected and the second external electrode 42 to which the plurality of second internal electrode layers 32 are connected.

Base Electrode Layer

As shown in FIGS. 2, 4, and 5, the first external electrode 41 includes a first base electrode layer 51 and a first plated layer 71. The first plated layer 71 is on the first base electrode layer 51. The second external electrode 42 includes a second base electrode layer 52 and a second plated layer 72. The second plated layer 72 is on the second base electrode layer 52.

The first base electrode layer 51 is on the first end surface 7. The first base electrode layer 51 contacts the first extension portion 35 of each of the plurality of first internal electrode layers 31 exposed at the first end surface 7. The first base electrode layer 51 extends from the first end surface 7 to a portion of the first main surface 3 and a portion of the second main surface 4, and to a portion of the first lateral surface 5 and a portion of the second lateral surface 6.

The second base electrode layer 52 is on the second end surface 8. The second base electrode layer 52 contacts the second extension portion 36 of each of the plurality of second internal electrode layers 32 exposed at the second end surface 8. The second base electrode layer 52 extends from the second end surface 8 to a portion of the first main surface 3 and a portion of the second main surface 4, and to a portion of the first lateral surface 5 and a portion of the second lateral surface 6.

Each of the first base electrode layer 51 and the second base electrode layer 52 is, for example, a fired layer. The fired layer preferably includes a metal component. The fired layer preferably includes at least one of a glass component or a ceramic component in addition to a metal component. The metal component includes, for example, at least one of copper, nickel, silver, or palladium, an alloy of silver and palladium, gold, or the like. The glass component includes, for example, at least one of boron, silicon, barium, magnesium, aluminum, or lithium, or the like. The ceramic component may be a ceramic material the same as or similar to the dielectric layers 20. The ceramic component may be a ceramic material different from the dielectric layers 20. The ceramic component includes, for example, at least one of barium titanate, calcium titanate, a mixed crystal material obtained by replacing a portion of barium of barium titanate with calcium, strontium titanate, or calcium zirconate, or the like.

Examples of the fired layer include a layer formed by coating a multilayer body with an electrically conductive paste containing glass and metal and firing the resultant product. The fired layer is formed by simultaneously firing a multilayer chip before firing, which is a material of a multilayer body including a plurality of internal electrode layers and a plurality of dielectric layers, and an electrically conductive paste applied to the multilayer chip. Alternatively, the fired layer is formed by firing a multilayer chip to obtain a multilayer body, then applying an electrically conductive paste to the multilayer body, and firing the resultant product. In a case in which the electrically conductive paste is fired after the multilayer body is obtained, the fired layer is preferably formed by firing the electrically conductive paste to which a ceramic material is added instead of the glass component. When an electrically conductive paste to which a ceramic material is added is used, the ceramic material to be added is preferably a ceramic material of the same kind as the dielectric layer. The fired layer may include a plurality of layers.

An example of a preferable thickness in the length direction L of the first base electrode layer 51 on the first end surface 7 is about 10 μm or more and about 200 μm or less in the middle portion in the height direction T and the width direction W of the first base electrode layer 51.

An example of a preferable thickness in the length direction L of the second base electrode layer 52 on the second end surface 8 is about 10 μm or more and about 200 μm or less in the middle portion in the height direction T and the width direction W of the second base electrode layer 52.

In a case where the first base electrode layer 51 is also provided on a portion of at least one of the first main surface 3 or the second main surface 4, an example of a preferable thickness in the height direction T of the first base electrode layer 51 provided on this portion is about 3 μm or more and about 40 µm or less in the middle portion in the length direction L and the width direction W of the first base electrode layer 51 provided on this portion.

In a case where the first base electrode layer 51 is also provided on a portion of at least one of the first lateral surface 5 or the second lateral surface 6, an example of a preferable thickness in the width direction W of the first base electrode layer 51 provided on this portion is about 3 µm or more and about 40 µm or less in the middle in the length direction L and the height direction T of the first base electrode layer 51 provided on this portion.

In a case where the second base electrode layer 52 is also provided on a portion of at least one of the first main surface 3 or the second main surface 4, an example of a preferable thickness in the height direction T of the second base electrode layer 52 provided on this portion is about 3 µm or more and about 40 µm or less in the middle in the length direction L and the width direction W of the second base electrode layer 52 provided on this portion.

In a case where the second base electrode layer 52 is also provided on a portion of at least one of the first lateral surface 5 or the second lateral surface 6, an example of a preferable thickness of the second base electrode layer 52 in the width direction W provided on this portion is about 3 µm or more and about 40 µm or less in the middle of the second base electrode layer 52 in the length direction L and the height direction T provided on this portion.

The first plated layer 71 covers the first base electrode layer 51. The second plated layer 72 covers the second base electrode layer 52.

The first plated layer 71 and the second plated layer 72 may include, for example, at least one of copper, nickel, tin, silver, palladium, an alloy of silver and palladium, gold, and the like. Each of the first plated layer 71 and the second plated layer 72 may include a plurality of layers. A preferable configuration of the first plated layer 71 and the second plated layer 72 is a two-layer configuration in which a tin plated layer is provided on a nickel plated layer, for example.

The first plated layer 71 covers the first base electrode layer 51. In the present example embodiment, the first plated layer 71 includes a first nickel plated layer 73 and a first tin plated layer 75. The first tin plated layer 75 is on the first nickel plated layer 73.

The second plated layer 72 covers the second base electrode layer 52. In the present example embodiment, the second plated layer 72 includes a second nickel plated layer 74 and a second tin plated layer 76. The second tin plated layer 76 is on the second nickel plated layer 74.

The nickel plated layer reduces or prevents the erosion of the first base electrode layer 51 and the second base electrode layer 52 by solder when the multilayer ceramic capacitor 1 is mounted. The tin plated layer improves wettability of solder when the multilayer ceramic capacitor 1 is mounted. The tin plated layer facilitates mounting of the multilayer ceramic capacitor 1. The thickness of each of the first nickel plated layer 73, the first tin plated layer 75, the second nickel plated layer 74, and the second tin plated layer 76 is, for example, preferably about 2 µm or more and about 10 µm or less.

Each of the external electrodes 40 may include an electrically conductive resin layer including electrically conductive particles and a thermosetting resin. When each of the external electrodes 40 includes an electrically conductive resin layer, the electrically conductive resin layer may cover the fired layer. When the electrically conductive resin layer covers the fired layer, the electrically conductive resin layer is provided between the fired layer and the plated layer. The fired layer corresponds to the first base electrode layer 51 and the second base electrode layer 52. The plated layer corresponds to the first plated layer 71 and the second plated layer 72. The electrically conductive resin layer may completely cover the fired layer. The electrically conductive resin layer may cover a portion of the fired layer.

The electrically conductive resin layer including a thermosetting resin is more flexible than an electrically conductive layer including a plating film or a fired product of an electrically conductive paste. Therefore, when a physical impact or an impact caused by a thermal cycle is applied to the multilayer ceramic capacitor, the electrically conductive resin layer functions as a buffer layer. Therefore, the electrically conductive resin layer reduces or prevents the generation of cracks in the multilayer ceramic capacitor.

Examples of metals of the electrically conductive particles include silver, copper, nickel, tin, bismuth, and alloys including at least two of these metals. The electrically conductive particles preferably include silver, for example. Examples of conductive particles include silver metal powder. Silver has the lowest specific resistance among metals. Silver is suitable for electrode materials. Silver is a noble metal. Silver is difficult to oxidize. Silver has high weatherability. For these reasons, silver metal powder is suitable as conductive particles.

The electrically conductive particles may be silver-coated metal powders. When conductive particles whose surface is silver-coated are used, the metal powder is, for example, preferably a powder of copper, nickel, tin, bismuth, or an alloy thereof. It is preferable to use silver-coated metal powder to maintain silver characteristics and make the metal of the base material inexpensive.

The electrically conductive particles may be provided by subjecting copper or nickel to an antioxidant treatment. The electrically conductive particles may be metal powder in which the surface of the metal powder is coated with tin, nickel, or copper, for example. When a metal powder coated with tin, nickel, or copper is used on the surface of the metal powder, the metal powder is, for example, preferably silver, copper, nickel, tin, bismuth, or an alloy powder including at least two of these metals.

The shape of the electrically conductive particles is not limited. Examples of the shape of the electrically conductive particles include a spherical shape and a flat shape. It is preferable to use a mixture of spherical metal powder and flat metal powder.

The electrically conductive particles included in the electrically conductive resin layer mainly ensure the electric conductivity of the electrically conductive resin layer. When the plurality of conductive particles are brought into contact with each other, an energizing path is provided inside the electrically conductive resin layer.

Examples of the resin of the electrically conductive resin layer may include at least one of various known thermosetting resins such as epoxy resin, phenol resin, urethane resin, silicone resin, and polyimide resin. Among them, an epoxy resin is one of preferable resins. The epoxy resin is excellent in heat resistance, moisture resistance, adhesiveness, and the like. The resin of the electrically conductive resin layer preferably includes a curing agent together with the thermosetting resin. When an epoxy resin is used as the base resin, the curing agent of the epoxy resin may be any of various known compounds such as, for example, phenolic, amine-based, acid anhydride-based, imidazole-based, active ester-based, and amideimide-based compounds.

The electrically conductive resin layer may include a plurality of layers. The thickness of the thickest portion of the electrically conductive resin layer is, for example, preferably about 10 μm or more and about 150 μm or less.

The basic configuration of the multilayer ceramic capacitor 1 is described above. The preferable length in the length direction L of the multilayer ceramic capacitor 1 including the multilayer body 2 and the external electrode 40 is, for example, about 0.2 mm or more and about 6 mm or less. The preferable length in the height direction T of the multilayer ceramic capacitor 1 is, for example, about 0.05 mm or more and about 5 mm or less. The preferable length in the width direction W of the multilayer ceramic capacitor 1 is, for example, about 0.1 mm or more and about 5 mm or less.

Segregation of Silicon and Magnesium, Segregation Portion

Figure 6:
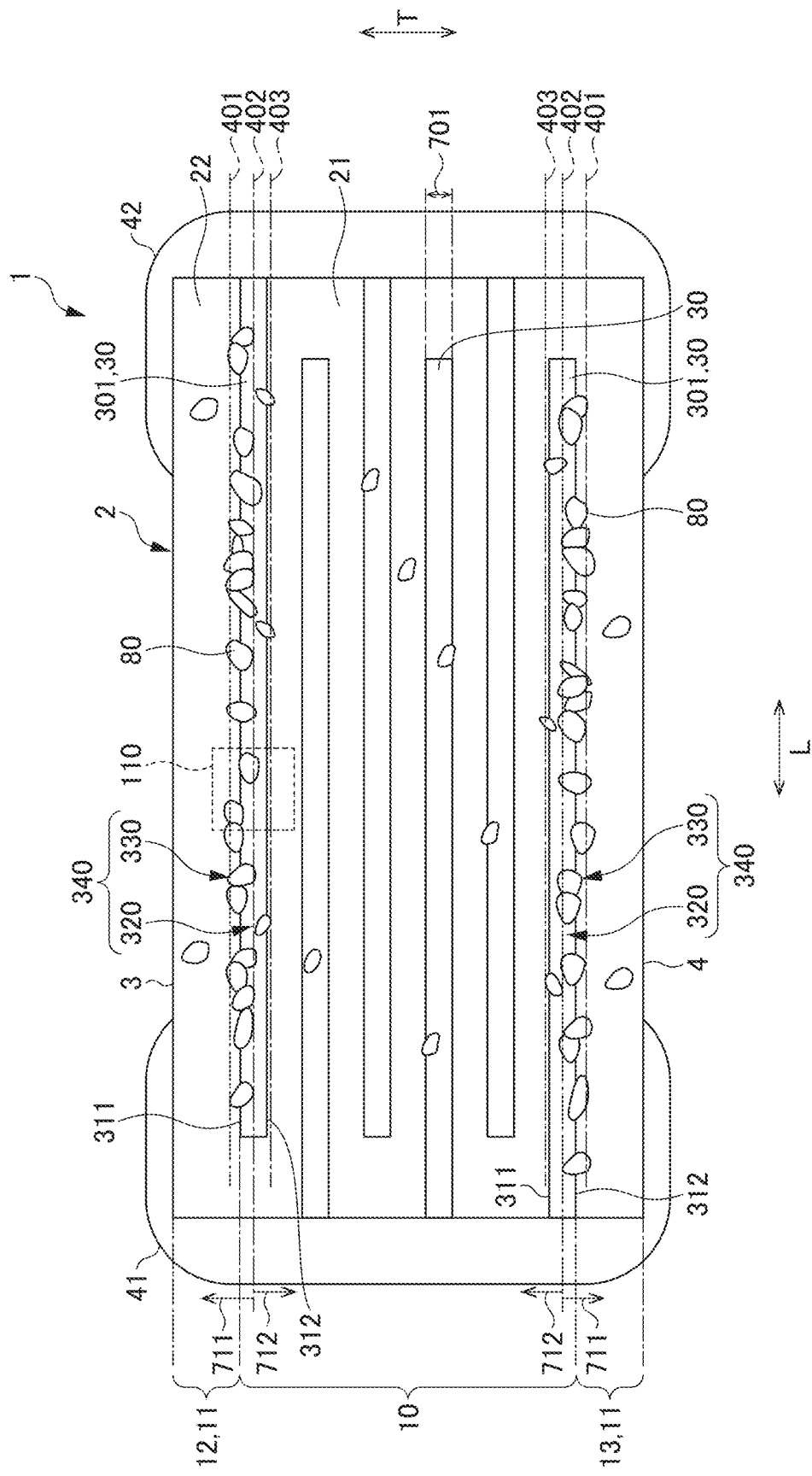
FIG. 6 is a cross-sectional view taken along the line 101-101 of FIG. 1.

In the multilayer ceramic capacitor 1 of the present example embodiment, portions in which silicon or magnesium segregates exist in the multilayer body 2. These portions are defined as segregation portions 80. The segregation portions 80 are not uniformly present in the multilayer body 2, but rather are unevenly distributed. A description will be made with reference to FIG. 6. FIG. 6 is a cross-sectional view taken along the line 101-101 of FIG. 1. However, in FIG. 6, each portion is simplified as compared with FIG. 2 which is also a cross-sectional view taken along the line 101-101 of FIG. 1. On the other hand, in FIG. 6, the segregation portions 80 are emphasized.

Outermost Internal Electrode Layer

Among the internal electrode layers 30, the internal electrode layer 30 closest to one of the main surface-side outer layer portions 11 (the outer layer portion) is defined as an outermost internal electrode layer 301. The distribution of the segregation portions 80 in the vicinity of the outermost internal electrode layer 301 will be described. FIG. 6 shows two outermost internal electrode layers 301 including an outermost internal electrode layer 301 adjacent to the first main surface-side outer layer portion 12 and an outermost internal electrode layer 301 adjacent to the second main surface-side outer layer portion 13. In the following description, the outermost internal electrode layer 301 will be described by taking the outermost internal electrode layer 301 adjacent to the first main surface-side outer layer portion 12 as an example. The same applies to the other outermost internal electrode layer 301.

Outer Layer Side and Inner Layer Side of Outermost Internal Electrode Layer

In the multilayer ceramic capacitor 1 of the present example embodiment, the segregation amount of silicon and magnesium on the outer layer side 711 of the outermost internal electrode layer 301 is larger than the segregation amount of silicon and magnesium on the inner layer side 712 of the outermost internal electrode layer 301.

Here, the outer layer side 711 of the outermost internal electrode layer 301 refers to a side of the outermost internal electrode layer 301 which is in contact with the main surface-side outer layer portion 11. The inner layer side 712 of the outermost internal electrode layer 301 refers to the opposite side of the outer layer side 711.

Outer Layer Surface and Inner Layer Surface of Outermost Internal Electrode Layer Of the two surfaces parallel or substantially parallel to the length direction L of the outermost internal electrode layer 301, the surface of the outer layer side 711 is defined as an outer layer surface 311. Of the two surfaces parallel or substantially parallel to the length direction L of the outermost internal electrode layer 301, the surface of the inner layer side 712 is defined as an inner layer surface 312.

The amount of segregation of silicon and magnesium on the outer layer side 711 of the outermost internal electrode layer 301 refers to the amount of segregation portions 80 protruding from the outer layer surface 311 toward the outer layer side 711. On the other hand, the amount of segregation of silicon and magnesium on the inner layer side 712 of the outermost internal electrode layer 301 refers to the amount of segregation portion 80 protruding from the inner layer surface 312 toward the inner layer side 712. That is, the segregation amount of silicon and magnesium are directed to the segregation portions 80 at least partially in contact with the outermost internal electrode layer 301.

As shown in FIG. 6, in the multilayer ceramic capacitor 1 of the present example embodiment, the segregation amount of silicon and magnesium on the outer layer side 711 of the outermost internal electrode layer 301 are larger than the segregation amount of silicon and magnesium on the inner layer side 712 of the outermost internal electrode layer 301.

Evaluation of Segregation Amount

Figure 7:
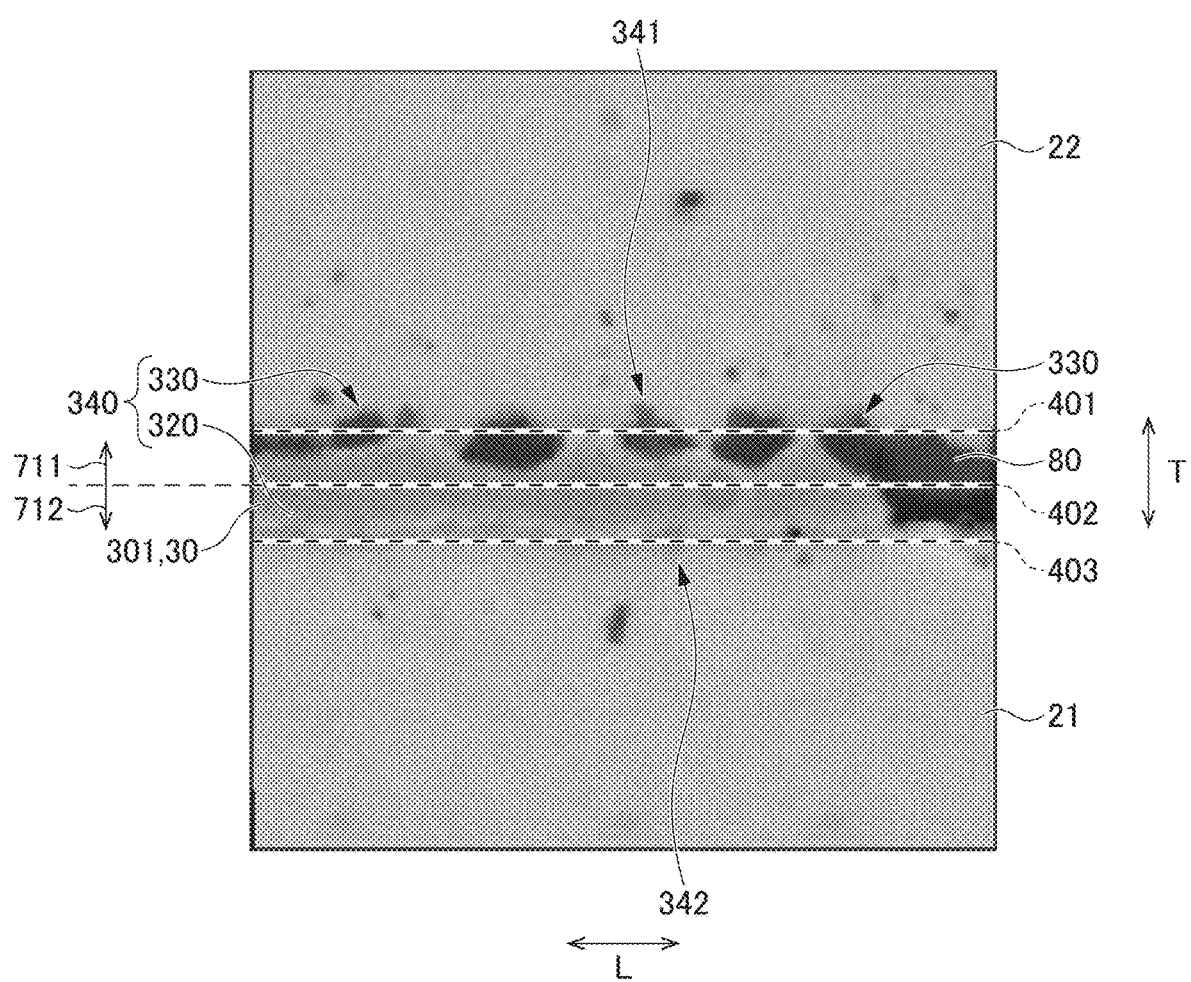
FIG. 7 is an enlarged image of a portion corresponding to an enclosure 110 of FIG. 6.
Figure 8:
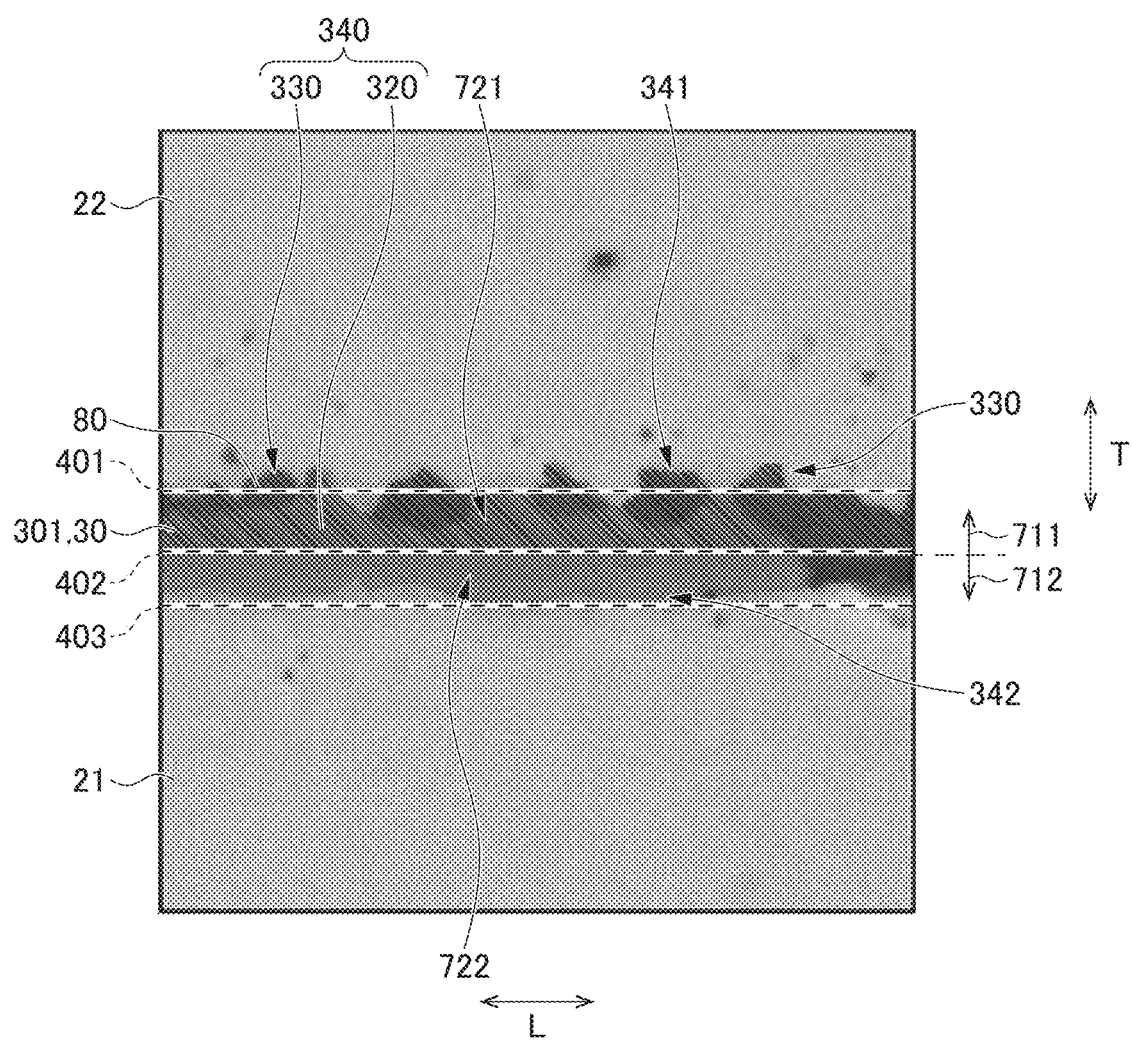
FIG. 8 is an enlarged image of a portion corresponding to the enclosure 110 of FIG. 6.

The amount of segregation can be evaluated by observing the cross section of the multilayer body 2. A description will be provided with reference to FIGS. 7 and 8. FIGS. 7 and 8 are enlarged images of a portion corresponding to the enclosure 110 of FIG. 6. FIGS. 7 and 8 are reflected electron microscope images. In FIG. 7, black portions indicate the segregation portions 80. The amount of segregation can be evaluated by the area of the segregation portion 80.

As shown in FIG. 8, the segregation amount of silicon and magnesium on the outer layer side 711 of the outermost internal electrode layer 301 are larger than the segregation amount of silicon and magnesium on the inner layer side 712 of the outermost internal electrode layer 301. Hereinafter, the segregation portions 80 will be described in detail in order.

Existence Region of Outermost Internal Electrode Layer

In the outermost internal electrode layer 301, a region where a material for the internal electrode layer 30 of the outermost internal electrode layer 301 exists is defined as an existence region 320 of the outermost internal electrode layer 301. The existence region 320 of the outermost internal electrode layer 301 corresponds to a region sandwiched between the outer layer surface 311 and the inner layer surface 312 in the LT cross section shown in FIG. 6.

Segregation Region of Silicon and Magnesium

A region where the entire segregation portions 80 in contact with the outermost internal electrode layer 301 is defined as segregation regions 330 of silicon and magnesium. In FIGS. 6 to 8, portions of the segregation regions 330 are denoted by reference numerals. The segregation regions 330 are not necessarily continuous in the length direction L.

First Region

A region in which the existence region 320 of the outermost internal electrode layer 301 and the segregation regions 330 of silicon and magnesium are combined is defined as a first region 340.

Line Edge Roughness

The line edge roughness of the first region 340 will be described. The line edge roughness refers to a variation in the position of line edges. In the multilayer ceramic capacitor 1 of the present example embodiment, the line edge roughness at the end of the outer layer side 711 of the first region 340 is larger than the line edge roughness at the end of the inner layer side 712 of the first region 340.

The line edge roughness will be described with reference to FIG. 9. The line edge roughness is calculated in the following two stages.

(1) The coordinates of edge points of a measurement line are calculated, and an approximate straight line is calculated based on the coordinates.

(2) A deviation between the calculated approximate curve and the edge points is calculated as a line edge roughness.

Figure 9:
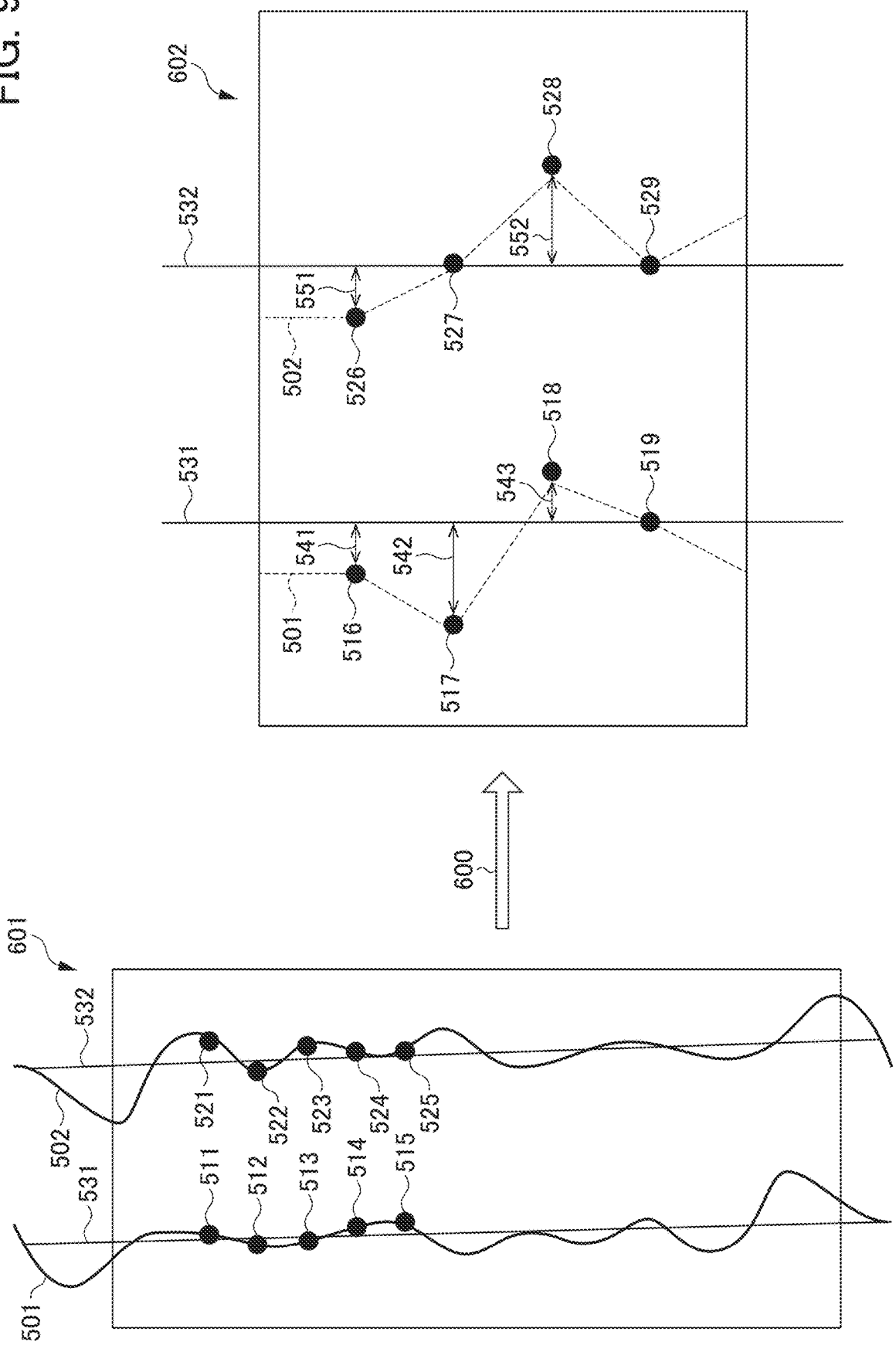
FIG. 9 is a diagram for explaining line edge roughness.

FIG. 9 is a diagram for explaining how to calculate line edge roughness. FIG. 9 shows two measurement lines, i.e., a measurement line 501 and a measurement line 502. However, the method of calculating the approximate straight line and the method of calculating the line edge roughness are the same between the measurement line 501 and the measurement line 502.

The diagram 601 on the left side of FIG. 9 shows a method of calculating the approximate straight line. Black circles 511 to 515 on the measurement line 501 and black circles 521 to 525 on the measurement line 502 indicate edge points of the measurement line. In order to calculate the line edge roughness, first, an approximate straight line with respect to the edge points of the measurement line is calculated. The obtained approximate straight lines are approximate straight lines 531 and 532.

Next, as indicated by an arrow 600, the line edge roughness is calculated based on the obtained approximate straight line 531 and the approximate straight line 532. The diagram 602 on the right side of FIG. 9 shows a method of calculating edge roughness. The edge roughness is a deviation from an approximate straight line for each edge point. Black circles 516 and 519 on the measurement line 501 and black circles 526 to 529 on the measurement line 502 indicate edge points of the measurement line. For example, the deviation between the edge point 516 of the measurement line 501 and the approximate straight line 531 is an amount indicated by an arrow 541. Hereinafter, the amount indicated by the arrow 541 is described as edge roughness 541.

Next, an example of a method of obtaining the line edge roughness will be described. For the measurement line 501, the edge roughness 541 of the edge point 516, the edge roughness 542 of the edge point 517, the edge roughness 543 of the edge point 518, and the edge roughness of the edge point 519 are averaged. This average value is defined as line edge roughness.

The edge point 519 is located on the approximate straight line 531. Therefore, the edge roughness of the edge point 519 is 0. Also in the measurement line 502, the line edge roughness can be calculated in the same manner as in the measurement line 502.

In the multilayer ceramic capacitor 1 of the present example embodiment, the line edge roughness was calculated according to the following specification. Image analysis and measurement software: WinROOF (product name)

Measurement magnification: 10,000 times

Image: Reflected electron images

Number of field of view: Average of 5 Fields

Specifically, in the above specification, the internal electrode layer 30 in the field of view is divided into 256 sections in the length direction L. Then, the average value of the edge roughness of each segment is used as the line edge roughness. That is, the average value of the edge roughness at n=about 624

The line edge roughness of each of the five fields of view is calculated. Then, a value obtained by averaging the calculated five line edge roughnesses is defined as the line edge roughness of the present disclosure.

Line Edge Roughness on Outer Layer Side and Line Edge Roughness on Inner Layer Side In the multilayer ceramic capacitor 1 of the present example embodiment, the line edge roughness (LER) A of the outer layer side 711 of the first region 340 is larger than the line edge roughness (LER) B of the inner layer side 712 of the first region 340.

FIG. 8 shows the contour of the outer layer side 711 of the first region 340 as the outer layer side line 341 of the first region. Similarly, the contour of the inner layer side 712 of the first region 340 is shown as the inner layer side line 342 of the first region. The line edge roughness A of the outer layer side line 341 of the first region is greater than the line edge roughness B of the inner layer side line 342 of the first region.

In the multilayer ceramic capacitor 1 of the present example embodiment, with the above-described configuration, it is possible to provide the multilayer ceramic capacitor 1 that is able to reduce or prevent the occurrence of layer peeling when mechanical stress is applied. In particular, it is possible to provide the multilayer ceramic capacitor 1 that is able to reduce or prevent the occurrence of layer peeling between the inner layer portion 10 and the main surface-side outer layer portions 11.

According to the above configuration, only the outer layer side 711 of the outermost internal electrode layer 301 increases line edge roughness, i.e., surface unevenness.

Therefore, the mechanical bonding between the inner layer portion 10 and the main surface-side outer layer portion 13 is strengthened, and the layer peeling is reduced or prevented.

According to the above configuration, the inner layer side 712 of the outermost internal electrode layer 301 is relatively smooth. Therefore, the reliability of the multilayer ceramic capacitor 1 is not substantially reduced.

Thickness of Internal Electrode Layer and Line Edge Roughness

A more preferable range of line edge roughness will be described. The average thickness 701 of the internal electrode layer 30 shown in FIG. 6 is defined as C. A value obtained by dividing the average value A of the line edge roughness of the outer layer side 711 of the first region 340 by the average thickness C of the internal electrode layer 30, i.e., a ratio (A/C) is defined as a value D. The value D is, for example, preferably about 0.093 or more and about 0.341 or less.

When the value D is less than about 0.093, the unevenness of the outer layer side 711 of the outermost internal electrode layer 301 is not sufficient with respect to the thickness of the internal electrode layer 30. Therefore, the reduction or prevention of the layer peeling may be insufficient.

On the other hand, when the value D exceeds about 0.341, since the unevenness is too large, the mechanical bonding between the inner layer portion 10 and the main surface-side outer layer portion 13 is weakened. Therefore, the reduction or prevention of the layer peeling may be insufficient.

Line Edge Roughness on Outer Layer Side and Line Edge Roughness on Inner Layer Side The ratio (A/B) of the line edge roughness A of the outer layer side 711 of the first region 340 to the line edge roughness B of the inner layer side 712 of the first region 340 described above is defined as a value E. The value E is, for example, preferably about 1.23 or more and about 6.70 or less.

By setting the value D and the value E within the above-described range, the line edge roughness can be increased only on the outer layer side 711 of the outermost internal electrode layer 301, and the unevenness can be increased. Therefore, the mechanical bonding between the inner layer portion 10 and the main surface-side outer layer portions 11 can be further improved. As a result, it is possible to further reduce or prevent layer peeling.

Area Ratio Between Outer Layer Side and Inner Layer Side

The areas of the outer layer side 711 and the inner layer side 712 in the first region 340 will be described. FIG. 8 shows an area 721 of the outer layer side 711 of the first region 340 and an area 722 of the inner layer side 712 of the first region 340. A value of a ratio of the outer layer side 711 of the first region 340 to the area 722 of the inner layer side 712 of the first region 340 is defined as a value F. The value F is, for example, preferably about 1.1 or more and about 3.30 or less.

With the above configuration, the line edge roughness increases only on the outer layer side 711 of the outermost internal electrode layer 301, and the unevenness increases. Therefore, the mechanical bonding between the inner layer portion 10 and the main surface-side outer layer portions 11 is further improved. As a result, it is possible to achieve the advantageous effect of reducing or preventing the layer peeling significantly.

When the value F exceeds 1, it indicates that the segregation amount of silicon and magnesium on the outer layer side 711 of the outermost internal electrode layer 301 is larger than the segregation amount of silicon and magnesium on the inner layer side 712 of the outermost internal electrode layer 301.

Area Measurement Method

An example of a method of measuring the area in the first region 340 will be described with reference to FIGS. 7 and 8.

First, in a region where a metal material, for example, nickel, of the internal electrode layer 30 exists, outer lines are drawn at both side edges in the height direction T. Lines 401 and 403 shown in FIGS. 7 and 8 are the outer lines.

Next, a middle line is drawn in the middle in the height direction T between the lines 401 and 403. The line 402 shown in FIGS. 7 and 8 is the middle line. The middle line 402 is defined as the middle in the height direction T of the internal electrode layer 30.

Next, the areas on both sides of the middle line 402 in the first region 340 are calculated. The area of the portion surrounded by the middle line 402 and the outer layer side line 341 of the first region 340 is defined as the area 721 of the outer layer side 711 of the first region 340. The area of the portion surrounded by the middle line 402 and the inner layer side line 342 of the first region 340 is defined as the area 722 of the inner layer side 712 of the first region 340.

Next, the ratio of the calculated area 721 to the area 722 is obtained. When the area is calculated, the area including magnesium segregation and magnesium existing together with nickel is measured.

EXAMPLES AND COMPARATIVE EXAMPLES

The evaluation results of Examples and Comparative Examples will be described with reference to FIG. 10. FIG. 10 is a table showing the evaluation results of Examples and Comparative Examples. First, a sample used for evaluation will be described.

Sample
  Dimensions of the multilayer ceramic capacitor: Dimension in the length direction L×dimension in the width direction W×dimension in the height direction T=about 3.15 mm×about 1.65 mm× about 1.65 mm
  Ceramic material: Barium titanate
  Capacitance: about 10 µF
  Internal electrode layer material: Nickel Samples were manufactured by lot unit according to the manufacturing method described below, with manufacturing conditions adjusted for different line edge roughness, as Examples 1-22 and Comparative Examples 1-3. The samples in each lot were manufactured with the same manufacturing conditions. For each Example and Comparative Example, n samples (n=3) for measuring line edge roughness and thickness of inner electrode layer and n samples (n=100) for layer peeling evaluation were taken and prepared from the same lot. For measuring the line edge roughness and the internal electrode layer, the average value of the measurement result of n=3 was used.

Evaluation Method of Layer Peeling

The fired multilayer body was subjected to appearance observation by outside-machine sorting to confirm the existence or absence of a peeling site between the inner layer portion and the outer layer portion.
  (N=100)

Criteria for Determination
  Determination is based on the number of peeling sites per 100.
    0 or more and 10 or less: ⊙ (bullseye symbol)
    11 or more and 30 or less: ○ (circle symbol)
    31 or more and 70 or less: Δ (triangle symbol)
    71 or more and 100 or less: x (cross symbol)
    101 or more: x (cross symbol)

Evaluation Results

As shown in FIG. 9, in a case where the line edge roughness A on the outer layer side of the first region is larger than the line edge roughness B on the inner layer side of the first region, the layer peeling after firing was determined as any one of ⊙ (bullseye symbol), ○ (circle symbol), or Δ (triangle symbol).

When the ratio D of the line edge roughness A on the outer layer side of the first region to the average thickness C of the internal electrode layer is about 0.093 or more and about 0.341 or less, and the ratio E of the line edge roughness A on the outer layer side of the first region to the line edge roughness B on the inner layer side of the first region is about 1.23 or more and about 6.70 or less, the layer peeling was determined as any one of ⊙ (bullseye symbol) or ○ (circle symbol).

Method of Manufacturing Multilayer Ceramic Capacitor

An example of a method of manufacturing the multilayer ceramic capacitor will be described. The method of manufacturing the multilayer ceramic capacitor is not limited to the following method.

A dielectric sheet for manufacturing the dielectric layer 20 and an electrically conductive paste for manufacturing the internal electrode layer 30 are prepared. Both of the dielectric sheet for manufacturing the dielectric layer 20 and the electrically conductive paste for manufacturing the internal electrode layer 30 include a binder and a solvent. The binder and the solvent may be known. Examples of a paste made of an electrically conductive material include a paste obtained by adding an organic binder and an organic solvent to a metal powder.

An electrically conductive paste for manufacturing the internal electrode layer 30 is printed on the dielectric sheet using a printing plate designed to have the shape of the internal electrode layer 30. Examples of printing methods include screen printing and gravure printing. Thus, a dielectric sheet having a pattern of the first internal electrode layer 31 and a dielectric sheet having a pattern of the second internal electrode layer 32 are prepared.

By laminating a predetermined number of dielectric sheets on which patterns of the internal electrode layers 30 are not printed, a portion to be the first main surface-side outer layer portion 12 adjacent to the first main surface 3 is formed. The dielectric sheet on which the pattern of the first internal electrode layer 31 is printed and the dielectric sheet on which the pattern of the second internal electrode layer 32 is printed are sequentially and alternately laminated thereon to form a portion to be the inner layer portion 10. A predetermined number of dielectric sheets on which patterns of the internal electrode layers 30 are not printed are laminated on the portion functioning as the inner layer portion 10 to form a portion functioning as the second main surface-side outer layer portion 13 adjacent to the second main surface 4. Thereby, a multilayer sheet is obtained.

Here, by increasing the concentrations of silicon and magnesium in the dielectric sheet corresponding to the main surface-side outer layer portion, silicon and magnesium can be selectively segregated on the outer layer side of the outermost internal electrode layer. Also, by adding a magnesium compound having a large particle diameter to the dielectric sheet corresponding to the main surface-side outer layer portion, magnesium can be selectively segregated on the outer layer side of the outermost internal electrode layer.

Next, the multilayer sheet is pressed in the height direction by, for example, a hydrostatic press or the like to prepare a multilayer block.

Next, the multilayer block is cut into a predetermined size and divided into a plurality of multilayer chips. Thereafter, each of the multilayer chips may be polished by, for example, barrel polishing or the like to round the corner portions and the ridge portions.

Next, the multilayer chip is fired. The multilayer body is manufactured by this firing. The firing temperature is, for example, preferably about 900° C. or more and about 1400° C. or less. The firing temperature can be varied depending on the materials of the dielectric and internal electrode layers.

An electrically conductive paste defining and functioning as the base electrode layer 50 is applied to both end surfaces of the multilayer body 2. In the present example embodiment, the base electrode layer 50 is a fired layer. The fired layer can be formed by, for example, applying an electrically conductive paste including a glass component and a metal to the multilayer body 2 by a method such as, for example, dipping, and then performing firing treatment. The temperature of the firing treatment at this time is about, preferably about 700° C. or more and about 900° C. or less.

The multilayer chip before firing and the electrically conductive paste applied to the multilayer chip may be fired simultaneously. In this case, the fired layer is preferably formed by, for example, firing a ceramic material added instead of the glass component. At this time, as the ceramic material to be added, it is preferable to use the same kind of ceramic material as that of the dielectric layer 20. In this case, an electrically conductive paste is applied to the multilayer chip before firing, and the multilayer chip and the electrically conductive paste applied to the multilayer chip are fired at the same time to form the multilayer body 2 in which the fired layer is formed.

Then, a plated layer is formed on the surface of the base electrode layer 50 made of the fired layer. In the present example embodiment, the first plated layer 71 is formed on the surface of the first base electrode layer 51. A second plated layer 72 is formed on the surface of the second base electrode layer 52. In the present example embodiment, for example, a nickel plated layer and a tin plated layer are formed as the plated layers. In the plating treatment, either electrolytic plating or electroless plating may be adopted. However, the electroless plating requires a pretreatment using a catalyst or the like in order to improve the plating precipitation rate, and therefore, there is a disadvantage that the process becomes complicated. Therefore, it is usually preferable to use electrolytic plating. The nickel plated layer and the tin plated layer are sequentially formed by, for example, barrel plating.

When the electrically conductive resin layer is provided, the electrically conductive resin layer may cover the fired layer. When the electrically conductive resin layer is provided, an electrically conductive resin paste including a thermosetting resin and a metal component is applied on the fired layer, and then heat-treated at a temperature, for example, from about 250° C. to about 550° C. or more. Thus, the thermosetting resin is thermally cured to form the electrically conductive resin layer. The atmosphere during the heat treatment is, for example, preferably an $N_2$ atmosphere. In order to prevent scattering of the resin and to prevent oxidation of various metal components, the oxygen concentration is, for example, preferably about 100 ppm or less.

The multilayer ceramic capacitor 1 is manufactured by the manufacturing process described above.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of laminated dielectric layers and a plurality of laminated internal electrode layers, a first main surface and a second main surface opposed to each other in a height direction, a first lateral surface and a second lateral surface opposed to each other in a width direction orthogonal or substantially orthogonal to the height direction, a first end surface and a second end surface opposed to each other in a length direction orthogonal or substantially orthogonal to the height direction and the width direction, an inner layer portion including the plurality of dielectric layers and the plurality of internal electrode layers that are alternately laminated, and outer layer portions that sandwich the inner layer portion in the height direction;
   a first external electrode on the first end surface; and
   a second external electrode on the second end surface; wherein
   when, among the plurality of laminated internal electrode layers, an internal electrode layer closest to the outer layer portion is defined as an outermost internal electrode layer, a segregation amount of silicon and magnesium on an outer layer side of the outermost internal electrode layer is larger than a segregation amount of silicon and magnesium on an inner layer side of the outermost internal electrode layer; and
   when a region defined by an existence region of the outermost internal electrode layer and a segregation region of silicon and magnesium in contact with the outermost internal electrode layer is defined as a first region, a line edge roughness A of an outer layer side of the first region is larger than a line edge roughness B of an inner layer side of the first region.

2. The multilayer ceramic capacitor according to claim 1, wherein
   when a ratio of the line edge roughness A of the outer layer side of the first region relative to an average thickness C of the plurality of internal electrode layers (A/C) is defined as D; and when a ratio of the line edge roughness A of the outer layer side of the first region relative to the line edge roughness B of the inner layer side of the first region (A/B) is defined as E;

D is about 0.093 or more and about 0.341 or less, and E is about 1.23 or more and about 6.70 or less.

3. The multilayer ceramic capacitor according to claim 1, wherein when a ratio of an area of the outer layer side of the first region to an area of the inner layer side of the first region is defined as F, F is about 1.1 or more and about 3.30 or less.

4. The multilayer ceramic capacitor according to claim 1, wherein a dimension of the multilayer body in the length direction is about 0.2 mm or more and about 6 mm or less;

a dimension of the multilayer body in the height direction is about 0.05 mm or more and about 5 mm or less; and a dimension of the multilayer body in the width direction is about 0.1 mm or more and about 5 mm or less.

5. The multilayer ceramic capacitor according to claim 1, wherein each of the plurality of dielectric layers includes at least one of barium titanate, calcium titanate, strontium titanate, or calcium titanate as a main component.

6. The multilayer ceramic capacitor according to claim 5, wherein each of the plurality of dielectric layers includes at least one of a manganese compound, an iron compound, a copper compound, a cobalt compound, or a nickel compound as a subcomponent.

7. The multilayer ceramic capacitor according to claim 1, wherein a thickness of each of the plurality of dielectric layers is about 0.2 µm or more and about 10 µm or less.

8. The multilayer ceramic capacitor according to claim 1, wherein a number of the plurality of dielectric layers is 15 or more and 1200 or less.

9. The multilayer ceramic capacitor according to claim 1, wherein each of the plurality of internal electrode layers includes at least one of nickel, copper, silver, palladium, or gold, or an alloy including at least one of nickel, copper, silver, palladium, or gold.

10. The multilayer ceramic capacitor according to claim 1, wherein a thickness of each of the plurality of internal electrode layers is about 0.2 µm or more and about 2.0 µm or less.

11. The multilayer ceramic capacitor according to claim 1, wherein a number of the plurality of internal electrode layers is 15 or more and 1000 or less.

12. The multilayer ceramic capacitor according to claim 1, wherein the first external electrode extends from the first end surface to a portion of the first main surface and a portion of the second main surface, and to a portion of the first lateral surface and a portion of the second lateral surface; and the second external electrode extends from the second end surface to a portion of the first main surface and a portion of the second main surface, and to a portion of the first lateral surface and a portion of the second lateral surface.

13. The multilayer ceramic capacitor according to claim 1, wherein each of the first and second external electrodes includes a base electrode layer and a plated layer.

14. The multilayer ceramic capacitor according to claim 13, wherein the base electrode layer is a fired layer including a metal component and at least one of a glass component and a ceramic component.

15. The multilayer ceramic capacitor according to claim 14, wherein the metal component includes at least one of copper, nickel, silver, palladium, an alloy of silver and palladium, or gold.

16. The multilayer ceramic capacitor according to claim 14, wherein the glass component includes at least one of boron, silicon, barium, magnesium, aluminum, or lithium.

17. The multilayer ceramic capacitor according to claim 14, wherein the ceramic component includes at least one of barium titanate, calcium titanate, a mixed crystal material obtained by replacing a portion of barium of barium titanate with calcium, strontium titanate, or calcium zirconate.

18. The multilayer ceramic capacitor according to claim 13, wherein a thickness of the base electrode layer on the respective first and second end surfaces is about 10 µm or more and about 200 µm or less in a middle portion in the height direction and the width direction.

19. The multilayer ceramic capacitor according to claim 13, wherein the plated layer includes at least one of copper, nickel, tin, silver, palladium, an alloy of silver and palladium, or gold.

20. The multilayer ceramic capacitor according to claim 13, wherein the plated layer includes a nickel plated layer and a tin plated layer on the nickel plated layer.

* * * * *